Patented Oct. 12, 1948

2,451,376

UNITED STATES PATENT OFFICE 2,451,376

SEPARATION OF OLEFINS FROM HYDROCARBON MIXTURES

George G. Bernard, Evanston, and Donald C. Bond, Northbrook, Ill., assignors to The Pure Oil Company, Chicago, Ill., a corporation of Ohio No Drawing. Application November 14, 1945, Serial No. 628,654

10 Claims. (Cl. 260—677)

This invention relates to separation of olefins from hydrocarbon mixtures, and more particularly to the separation of olefins from refinery gases resulting from cracking of hydrocarbon oils and gases and from the destructive distillation of coal.

In the cracking of hydrocarbon oils and gases a considerable amount of gas is formed containing ethylene, propylene and butenes. It is common practice to fractionate the gases to separate $C_3$ and $C_4$ from the $C_2$ and lower boiling hydrocarbons. The $C_2$ and lower boiling hydrocarbons may contain ethylene in varied amounts from approximately 10% to 30% depending on the conditions under which the cracking is effected. Ethylene present in these gases is valuable as a starting material in the synthesis of various chemicals such as ethyl mercaptan, ethylene glycol, ethylene chloride, ethylene bromide, ethyl alcohol, and others, provided the ethylene can be concentrated or separated from the ethane, methane and hydrogen.

An object of this invention is to provide a method for separating ethylene from admixtures with other gases.

A further object of the invention is to prepare from a gas lean in ethylene a gas rich in ethylene.

A further object of the invention is to prepare from a gas mixture lean in olefins a gas rich in olefins.

Still another object of the invention is to provide a reagent capable of selectively separating olefins from admixtures with saturated hydrocarbons and hydrogen.

A further object of the invention is to provide a reagent capable of selectively extracting ethylene from gas mixtures containing $C_2$ and lower molecular weight refinery gases.

In accordance with our invention a gas from which ethylene is to be absorbed is contacted with acidic aqueous cuprous salt solution containing tertiary amine salts. We have discovered that acidic aqueous cuprous salt solutions containing tertiary amine salts are highly effective in absorbing olefins from admixtures with saturated hydrocarbons, hydrogen and other non-oxidizing gases.

In practicing the invention we may use any tertiary amine although we prefer those tertiary amines in which one of the groups replacing hydrogen in the $NH_3$ group is an aromatic radical and the other two groups are alkyl radicals. It will be understood, however, that the three groups connected to the nitrogen atom may all be alkyl, aryl, aralkyl, cyclo-paraffin or hydroaromatic groups, or that any combination of the aforesaid groups may be attached to the nitrogen atom. It will also be understood that the aforesaid hydrocarbon groups may be unsubstituted or substituted with halogen, hydroxyl, nitro or other groups. As examples of tertiary amines which may be used are mentioned, dimethyl aniline, dimethyl toluidine, nitro dimethyl aniline, bromo dimethyl aniline, trimethyl amine, triethanol-amine, dimethyl aminophenol, and dimethyl cyclohexylamine. The solution may be rendered acid by means of any well known acid, such as hydrofluoric, sulfuric and acetic, although we prefer to use hydrochloric acid. Sufficient acid should be present so that the normality of the solution with respect to free acid is above 1 and preferably between 2 and 4. Solutions of low acidity absorb less olefin than solutions of higher acidity.

The process is preferably carried out at elevated pressure of the order of 100 to 300 pounds per square inch. For a solution having the composition shown in Table II, the solubility of the olefin in the absorbing solution increases with the increase in pressure up to a pressure of approximately 200 pounds per square inch in accordance with the equation:

$$\log_{10} S = 5.9 \log_{10} p - 4.0$$

where S is the solubility of ethylene in moles per liter of solution and $p$ is the absolute pressure of ethylene in atmospheres. The treatment of the gas with the solution may be conducted at atmospheric temperatures, or at temperatures slightly above atmospheric. Good results are obtained at temperatures of approximately 60–100° F.

In order to demonstrate the invention a series of tests were made on substantially pure ethylene gas in which the gas was brought in contact with solutions made in accordance with this invention and with solutions in accordance with the prior art. In these tests the ethylene gas was contacted with the treating solution at a temperature of approximately 90° F. under a given pressure and the solution was continuously shaken during contact with the gas for a period of one hour, after which the amount of gas absorbed in the solution was determined by evacuating and refluxing the solution. The following table gives in tabular form the solutions tested and the solubility of the ethylene in the various solutions:

*Table I*

| No. | Composition of Solution | | | | Solubility of $C_2H_4$ Moles per liter of Soln. at— | |
|---|---|---|---|---|---|---|
| | Amine | Moles per liter of— | | | 0 Gage Pressure | 122 lb./in.² Gage Pressure |
| | | Amine Hydrochloride | HCl | $Cu_2Cl_2$ | | |
| 1 | Ethanolamine | 3.73 | 2.28 | Saturated | 0.08 | 0.71 |
| 2 | Tris (hydroxy methyl)-amino methane | 3.73 | 2.28 | do | 0.05 | 0.29 |
| 3 | Ethylaniline | 3.73 | 2.28 | do | 0.06 | 0.19 |
| 4 | Amyl aniline | 3.73 | 2.28 | do | 0.09 | 0.40 |
| 5 | Dimethyl aniline | 3.73 | 1.00 | do | | 0.48 |
| 6 | do | 3.73 | 1.07 | do | | 0.69 |
| 7 | do | 3.73 | 2.28 | do | | ¹1.42 |
| 8 | do | 3.73 | 3.00 | do | | 0.89 |
| 9 | do | 3.73 | 4.35 | do | | 1.18 |

¹ Ave. of four runs.

In tests Nos. 1 and 2 the amine used in preparing the treating solution was a primary amine. In tests Nos. 3 and 4 the amine used was a secondary amine, and in tests Nos. 5 to 9 the amine used was a tertiary amine.

From the data it will be seen that of five solutions of comparable concentration, dimethyl aniline was far superior to the primary and secondary amines tested. In test No. 7 twice as much ethylene was absorbed as was absorbed in any of the tests with primary or secondary amines. The data in Table I is also notable for the fact that the ability of the dimethyl aniline solution to absorb ethylene increased as the concentration of hydrochloric acid increased up to 2.28 moles, and thereafter showed poorer solubility.

In order to demonstrate the effect of pressure on the solubility of ethylene in aqueous dimethyl aniline hydrochloride solution saturated with cuprous chloride and acidified with hydrogen chloride, a series of tests were made in the same manner in which tests 1 to 9 were conducted, but in which pressure differed in each test. The results of these tests are tabulated in Table II.

*Table II*

| No. | Composition of Solution | Ethylene Pressure, lb./in.² Gage | Solubility of Ethylene, moles per liter of soln. |
|---|---|---|---|
| 10 | 3.73 M. per liter Dimethyl aniline hydrochloride, 2.28 N. HCl, Satd. with $Cu_2Cl_2$ | 0 | 0.26 |
| 11 | do | 30 | 0.74 |
| 12 | do | 50 | 0.85 |
| 13 | do | 100 | 1.25 |
| 14 | do | 122 | 1.42 |
| 15 | do | 215 | 2.00 |

It will be seen from the data in Table II that the solubility of ethylene in the treating solution increased in accordance with the formula previously given.

In order to demonstrate the selective action of the treating solution in separating ethylene from admixtures with saturated hydrocarbons a mixture composed of 90% of methane and 10% of ethylene was contacted at approximately 77° F. with an aqueous dimethyl aniline solution acidified with hydrogen chloride and saturated with cuprius chloride until the gas was in equilibrium with the solution as shown by the fact that no further reduction in pressure occurred upon continued contact of the solution with the gas. In these tests the initial pressure was 100 pounds per square inch gage. The results of the tests are given in Table III:

*Table III*

| No. | Solution | Gage Press. lb./in.² | | Per cent $C_2H_4$ in Residual Gas Phase | Per cent $C_2H_4$ in Gas Evolved from Liquid Phase by Evacuation and Refluxing | Liters at S. T. P. of Gas Evolved per liter of Absorbent Solution |
|---|---|---|---|---|---|---|
| | | Initial | Final | | | |
| 16 | 3.73 M. per liter Dimethyl Aniline Hydrochloride, 2.28 N. HCl, Satd. with Cuprous Chloride | 100 | 90 | 3.3 | 63.7 | 2.15 |
| 17 | do | 100 | 90 | 4.2 | 67.9 | 1.75 |

From the data in Table III it is apparent that the gas which remained in equilibrium with the treating solution contained in the neighborhood of 3% to 4% of ethylene. It will also be seen that the gas absorbed by the treating solution and separated therefrom by evacuation and refluxing contained in the neighborhood of 65% of ethylene, and that the amount of ethylene absorbed by the treating solution compared favorably with the amount of ethylene absorbed in test No. 13 in Table II. The data in Table III show that with a gas containing as little as 10% of ethylene it is possible in a single extraction step to concentrate the ethylene content of the gas to approximately 65%. A concentration of 65% is admirably suited for commercial purposes. In the event a gas of higher purity is desired it can be obtained by subjecting the once concentrated gas to a second extraction step.

It will be apparent that our invention may be carried out in any conventional manner, as for example by bubbling the gas to be concentrated through a bath of the treating solution, or by countercurrently contacting a stream of gas and a stream of treating solution in a tower equipped with contact surfaces, and thereafter reducing pressure on the solution and/or heating the solution to its boiling temperature in order to separate the absorbed gases therefrom.

Although in our tests we used dimethyl aniline hydrochloride, it will be understood that the invention is not limited to the use of the specific reagents, but that the invention is directed to the use of tertiary amine salts of various acids, such as sulfuric, hydrofluoric and acetic, and to the use of the corresponding acids to acidify the solution. The amount of amine may vary but in general it is desirable to add as much as will remain in solution. Likewise, solutions saturated with the copper salt will absorb more olefin than less concentrated solutions. Instead of cuprous chloride, cuprous salts of other acids such as those previously mentioned, as well as cuprous oxide may be used in preparing the solution. Care should be exercised to keep the solution out of contact with oxidizing agents in order to prevent the cuprous salt from oxidizing to the cupric salt. It is expedient to add a small amount of powered copper to the solution in order to insure that the copper salt remains in the cuprous form.

Although the invention has been described with particular reference to the concentration of ethylene, it should be understood that the invention is applicable to the separation of olefins, in general, from hydrocarbon gas mixtures. Where a gas containing hydrocarbons up to $C_4$ hydrocarbons is treated, a mixture of $C_2$, $C_3$ and $C_4$ olefins will be obtained which can subsequently be separated from each other by fractionation. Where the gas to be subjected to treatment has been fractionated into $C_4$, $C_3$ and $C_2$, and lighter fractions, the product resulting from the treatment with the solution, in general, does not have to be further fractionated in order to obtain an olefin free of higher or lower molecular weight olefins. The invention is admirably suited to the treatment of dry gas from the absorption treatment of cracked still refinery gases.

It will be seen, therefore, that we have discovered a treating agent and method for concentrating olefins contained in non-oxidizing gas mixtures.

It is claimed:

1. A composition suitable for absorbing olefins comprising an aqueous solution containing a tertiary aromatic amine hydrochloride, free hydrochloric acid and cuprous chloride.

2. A composition in accordance with claim 1 in which the solution contains approximately 3.73 moles of the amine hydrochloride, 2.28 moles per liter of the hydrochloric acid and is saturated with cuprous chloride.

3. A composition suitable for absorbing olefins comprising an aqueous solution containing dimethyl aniline hydrochloride, free hydrochloric acid and cuprous chloride.

4. A composition suitable for absorbing olefins comprising an aqueous solution containing approximately 3.73 moles per liter of dimethyl aniline hydrochloride, 2.28 moles per liter of hydrochloric acid and sufficient cuprous chloride to saturate it.

5. A method of concentrating olefins in a hydrocarbon gas mixture comprising contacting the mixture with the composition defined by claim 1 under superatmospheric pressure, separating non-absorbed gas from the composition and then separating the absorbed gas from the composition.

6. A method of concentrating ethylene in a hydrocarbon gas mixture comprising contacting the mixture with the composition defined in claim 3 under superatmospheric pressure, separating non-absorbed gas from the composition and then separating the absorbed gas from the composition.

7. A method of concentrating ethylene in a hydrocarbon gas mixture comprising contacting the mixture with the composition defined in claim 4 under superatmospheric pressure, separating non-absorbed gas from the composition and then separating the absorbed gas from the composition.

8. A composition for absorbing olefinic gases comprising an aqueous solution containing in solution an acid, a cuprous salt, and a salt of a tertitary amine.

9. A composition in accordance with claim 8 in which the tertiary amine is an aromatic amine.

10. A method of concentrating olefinic gases in a hydrocarbon gas mixture comprising contacting the mixture with a composition comprising an aqueous solution containing in solution an acid, a cuprous salt, and a salt of a tertiary amine under super-atmospheric pressure, separating non-absorbed gas from the composition and then separating the absorbed gas from the composition.

GEORGE G. BERNARD.
DONALD C. BOND.

REFERENCES CITED

The following references are of record in the file of this patent:

UNITED STATES PATENTS

| Number | Name | Date |
|---|---|---|
| 1,695,130 | Wietzel | Dec. 11, 1928 |
| 2,005,500 | Joshua et al. | June 18, 1935 |
| 2,389,658 | Fasce et al. | Nov. 27, 1945 |
| 2,395,957 | Breuer | Mar. 5, 1946 |